Oct. 4, 1955     L. L. STOTT     2,719,330
METHOD FOR MAKING POLYAMIDE ROD STOCK
Filed March 13, 1951
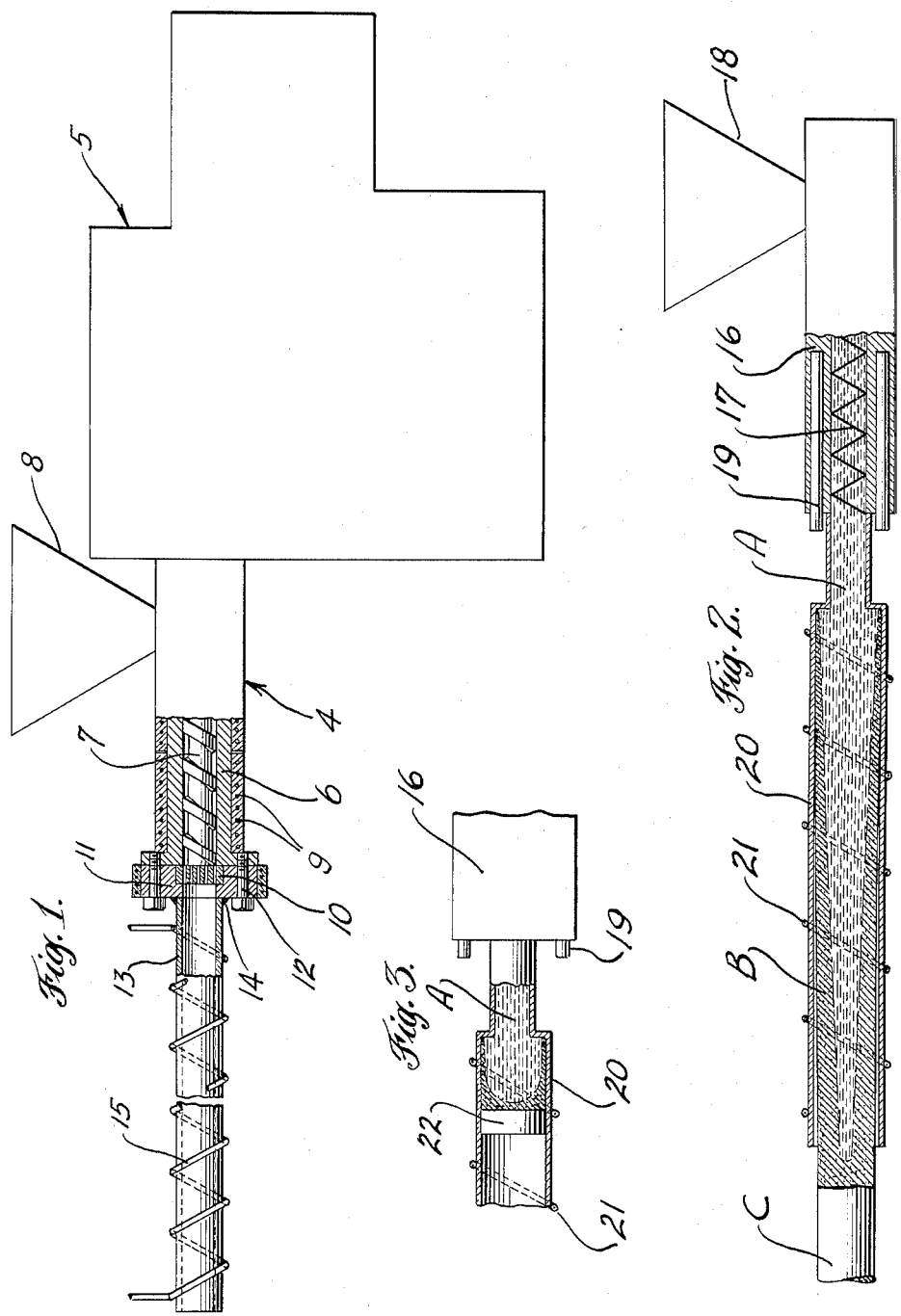
INVENTOR
Louis L. Stott
BY
Synnestvedt & Lechner
ATTORNEYS though in somewhat different ways as will be further explained hereafter.

2,719,330
METHOD FOR MAKING POLYAMIDE ROD STOCK

Louis L. Stott, Reading, Pa., assignor to The Polymer Corporation, Reading, Pa., a corporation of Pennsylvania Application March 13, 1951, Serial No. 215,339

3 Claims. (Cl. 18—55)

This invention relates to the production of rod stock from high melting synthetic linear polyamides known to the trade as nylon, for instance from polyhexamethylene adipamide or polyhexamethylene sebacamide.

Because of various characteristics of these high melting polyamides it has been difficult to produce rod stock therefrom, especially by means of continuously operating equipment and methods. Some of the characteristics in question include the fact that the high melting polyamides have relatively sharp melting points and are relatively mobile liquids in the molten condition. Moreover, these materials have a high coefficient of thermal expansion and are also characterized by substantial shrinkage upon solidification from the molten condition. Still further, the high melting polyamides have a marked tendency to degrade and/or oxidize when in the molten condition. As will be appreciated, these characteristics present special problems from the standpoint of formation of pieces therefrom, especially where rod or other pieces of substantial sectional dimension are concerned.

I have found, however, that continuous production of rod stock may be effected by the employment of relatively simple equipment arranged in a special manner and operated under certain controlled conditions.

Stated generally, it is an object of the present invention to provide for the continuous production of rod stock from the high melting polyamides, and thereby enable production of pieces of any desired length. This continuous production is further of advantage as compared with the known method of pressure molding individual rods of predetermined length, because of the greater production capacity of given equipment.

How the foregoing and other objects and advantages are attained will appear more fully from the following description, referring to the accompanying drawing, in which—

Figure 1 is a side view, partly in elevation and partly in section illustrating equipment used according to the present invention;

Figure 2 is a somewhat diagrammatic view illustrating the method of forming the rod; and Figure 3 is a fragmentary view of portions of Figure 2 and further illustrating the manner of initiating the continuous formation of rod stock according to the invention.

The manner in which the invention is carried into practice is explained herebelow with reference to the drawings, attention being first given to the apparatus itself as illustrated in Figure 1.

As seen in Figure 1, the equipment includes a screw feed device generally indicated by the numeral 4. This device is mounted on a supporting and driving mechanism indicated in outline at 5. The screw feed device itself comprises a tubular member 6 having an elongated cylindrical chamber therein adapted to receive the feed screw 7, which is geared or otherwise coupled with a driving motor (not shown) mounted in the supporting structure 5. A feed chute or funnel 8 is arranged to receive the polyamide to be used, desirably in flake or granular form, this chute delivering the material to the chamber in the member 6 and to the screw therein, and being advanced by the screw through the device toward the left when viewed as in Figure 1.

Heater elements, for instance electrical heaters such as indicated at 9 surround the member 6 and serve to melt the polyamide as it is being advanced. The rate of feed and the rate of heating is such as to effect complete melting of the polyamide in advance of the discharge end of the feed chamber. The molten polyamide is then delivered through the perforated breaker plate 10 arranged within the fitting 11 which is connected with the member 6 as by studs 12. The fitting 11 has a central passage therethrough communicating with the inlet end of a tube 13. This tube is fastened to the fitting to provide a liquid-tight connection, as by welding indicated at 14. The discharge end of the tube is open and the tube is surrounded by cooling means such as the water cooling coil 15.

Before analyzing the method, attention is first directed to Figures 2 and 3 and the more or less diagrammatic showing of the equipment therein. All of the essential structural elements described above in connection with Figure 1 are also incorporated in the arrangements of Figures 2 and 3, but the parts are shown in somewhat simplified form. Thus, the screw feed device shown in Figure 2 includes a cylindrical member 16 having a screw 17 working therein, this device being supplied with flake or granular polyamide through the funnel 18. The material progressing through the screw feed device is melted by means of heaters indicated at 19. The molten polyamide is fed into the entrance end of the tube 20 which may be cooled as by the cooling element 21.

As above indicated, the invention is concerned with the production of rod stock from the high melting polyamides, especially polyhexamethylene adipamide and polyhexamethylene sebacamide. The polyamide material used may, of course, contain other ingredients, for instance small quantities of fillers, such as graphite, antioxidants, or modifiers added for other purposes.

With regard to the polyamide materials usable according to the invention, it should also be pointed out that it is also of importance that the polyamide be carefully dried, preferably by warming under vacuum, prior to delivery of the flakes or granules thereof to the screw feed device.

In considering the following description of operation it should be kept in mind that polyhexamethylene adipamide has a rather sharp melting point at about 507° F., and that polyhexamethylene sebacamide similarly has a rather sharp melting point at about 455° F. Both of these materials shrink appreciably upon solidification and they further have coefficients of thermal expansion in the solid state such that drop in temperature below the solidification point is accompanied by considerable additional shrinkage.

For the foregoing reasons, formation of rod stock is advantageously effected under considerable pressure in order to avoid development of porosity, especially in the interior regions of the rod being formed. This is especially true with rods of substantial cross sectional dimension or diameter.

Notwithstanding the fact that the invention utilizes an open-ended tube into which the molten nylon material is fed, I have found that high pressure can be developed within the tube and that porosity can be avoided. This is true even in the production of rod stock of relatively large diameter for instance even up to about 4″ in diameter or somewhat larger. The invention is also effective in the production of rod stock even down to about ¼" in diameter.

Turning now to Figure 2, it is first noted that the showing thereof illustrates the production of rod stock according to the invention after the operation is initially started. The molten nylon A is delivered by the screw 7 into the entrance end of the tube 20. The external cooling of this tube causes solidification of the nylon radially inwardly as the material is advanced through the tube, the solidified portion being indicated at B. The completely solidified rod is shown at C.

As will be seen from Figure 2, in the initial cooling region in the tube 20 (toward the right hand end of the tube as viewed in Figure 2), a thin annulus of solidified material is quickly developed adjacent to the tube wall. The feed of the molten material A under pressure by the screw 17 tends to expand this annulus and maintains tight frictional engagement of this solidified annulus against the inside wall of the tube. This frictional engagement of the solidified portion with the tube wall serves as a reaction point against which relatively high pressure can be developed by the action of the continuous feed of molten material from the screw.

However, the pressure in the molten material is built up sufficiently to overcome the friction of the initially solidified annulus against the tube wall and the entire mass of material is thus advanced through the tube. As it advances, additional molten material solidifies against the tube wall adjacent to the entrance end. During advancement, moreover, the annular portion of the material which is solidified progressively becomes thicker, and as this annulus becomes thicker the shrinkage thereof reaches a value sufficiently high to overcome the tendency of the internal pressure to expand the annulus, whereupon the outer surface of the rod being formed gradually shrinks away from the tube wall, as is indicated in Figure 2.

From the foregoing it will be seen that for the production of a rod of given diameter, a forming tube is used having an internal diameter slightly greater than that of the rod desired.

The action described above depends upon several operating conditions, including the pressure, the rate of feed and the rate of cooling. These factors will, of course, vary according to the cross section or diameter of the rod being formed. The rate of feed and rate of cooling should be adjusted so that the frictional engagement of the solidified annulus in the initial cooling region will provide for the development of substantial pressure, to thereby feed additional molten material into the internal region or core of the rod being formed and thus avoid development of porosity as a result of shrinkage. Development of pressures of the order of from 200 lbs./sq. in. to 4000 lbs./sq. in. is appropriate for the purpose just mentioned.

The rate of cooling of the forming tube and the feed rate of the molten nylon influence the length of that portion of the solidified annulus which is maintained expanded against the tube wall. Low cooling rates and high feed rates tend to increase the length of the annular solidified portion in contact with the tube wall, and thus tend also to increase the frictional resistance against advancement of the material in the forming tube. Excessive increase in this frictional resistance will tend to stall the operation and it is therefore preferred to employ relatively high cooling rates.

For the purpose of initiating rod formation, a sliding plug 22 (see Figure 3) is positioned in the inlet end of the forming tube 20, this plug preferably having tight frictional engagement with the internal wall of the forming tube and serving temporarily as a means for development of pressure in the molten material delivered from the screw. Contact of the molten material with the plug also serves to solidify the nylon against the plug and thereby close the end of the molten core of the rod being formed. The plug 22 may be formed of a metal having a higher coefficient of expansion than that of the tube. Thus, a brass plug may be used in a steel tube. Such a plug may also be formed of polytetrafluoroethylene.

The starting plug (22) will be advanced through the tube and pushed out of the discharge end, after which the continued production of rod progresses in accordance with the above description of Figure 2.

I claim:

1. A method for forming rod stock of predetermined cross section from a high melting polyamide characterized by substantial volumetric shrinkage upon solidification, which method comprises heating the polyamide to render it liquid, initiating rod formation by feeding unformed liquid polyamide under pressure into one end of an elongated tube having an open discharge end and having a slidable plug therein initially positioned adjacent the inlet end of the tube, whereby the plug enables development of pressure in the entrance end of the tube, the plug being thereafter advanced through the tube under the influence of the pressure feed of the liquid polyamide, said tube having a bore of cross section larger than said predetermined cross section, advancing the liquid polyamide in the tube in contact with the interior thereof, cooling the polyamide while it is advancing in the tube to progressively solidify the polyamide radially inwardly as the rod being formed is advanced through the tube and thereby form a solidified annulus surrounding a core of liquid polyamide in an initial region of cooling, expanding said solidified annulus against the tube wall by feeding additional liquid polyamide into said core under pressure sufficient to overcome the tendency of said annulus to shrink away from the tube interior during solidification and thereby to develop frictional resistance against advancement of the rod being formed, continuing the pressure feed of unformed liquid polyamide to advance the rod being formed against said frictional resistance through said initial region of cooling and therebeyond, and continuing the cooling beyond said initial region, whereby said annulus thickens and shrinks away from contact with the tube interior to provide a solidified rod of said predetermined cross section.

2. A method for forming an elongated shape of predetermined cross section from a high melting polyamide characterized by substantial volumetric shrinkage upon solidification, which method comprises heating the polyamide to render it liquid, filling the entrance end of an elongated tube having an open discharge end with the liquid polyamide by feeding the liquid polyamide into said entrance end of the tube, said tube having a bore of cross section larger than said predetermined cross section, advancing the liquid polyamide in the tube in contact with the interior thereof, cooling the polyamide while it is advancing in the tube in contact with the tube interior by effecting heat transfer radially outwardly through the tube wall to progressively solidify the polyamide radially inwardly as the shape being formed is advanced through the tube and thereby form a solidified annulus surrounding a core of liquid polyamide in an initial region of cooling, expanding said solidified annulus against the tube wall by feeding additional liquid polyamide into said core under pressure sufficient to overcome the tendency of said annulus to shrink away from the tube interior during solidification and thereby to develop frictional resistance against advancement of the shape being formed, continuing the pressure feed of the liquid polyamide to advance the shape being formed against said frictional resistance through said initial region of cooling and therebeyond, and continuing the cooling beyond said initial region, whereby said annulus thickens and shrinks away from contact with the tube interior to provide a solidified shape of said predetermined cross section.

3. The method of claim 2 in which said feed of liquid polyamide to advance the material and the shape being formed through the tube is effected under a pressure of at least 200 lbs./sq. in.

(References on following page)

References Cited in the file of this patent

UNITED STATES PATENTS

| | | |
|---|---|---|
| 896,427 | Abbott | Aug. 18, 1908 |
| 2,309,729 | Gordon | Feb. 2, 1943 |
| 2,339,452 | Bailey et al. | Jan. 18, 1944 |
| 2,365,375 | Bailey et al. | Dec. 19, 1944 |
| 2,436,201 | Cole | Feb. 17, 1948 |
| 2,443,289 | Bailey | June 15, 1948 |
| 2,597,553 | Weber | May 20, 1952 |